US011675056B2

United States Patent
Akkaya et al.

(10) Patent No.: US 11,675,056 B2
(45) Date of Patent: *Jun. 13, 2023

(54) ILLUMINATION FOR ZONED TIME-OF-FLIGHT IMAGING

(71) Applicant: Microsoft Technology Licensing, LLC, Redmond, WA (US)

(72) Inventors: Onur C. Akkaya, Palo Alto, CA (US); Cyrus S. Bamji, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/152,143

(22) Filed: Jan. 19, 2021

(65) Prior Publication Data

US 2021/0141066 A1   May 13, 2021

Related U.S. Application Data

(63) Continuation of application No. 16/255,817, filed on Jan. 23, 2019, now Pat. No. 10,901,073, which is a
(Continued)

(51) Int. Cl.
  *G01S 7/481* (2006.01)
  *G02B 27/30* (2006.01)
  (Continued)

(52) U.S. Cl.
  CPC ............ *G01S 7/4817* (2013.01); *G01S 7/499* (2013.01); *G01S 17/42* (2013.01); *G01S 17/89* (2013.01); *G01S 17/894* (2020.01); *G02B 27/30* (2013.01)

(58) Field of Classification Search
  CPC ........ G01S 7/4817; G01S 7/499; G01S 17/42; G01S 17/89; G01S 17/894; G02B 27/30
  See application file for complete search history.

(56) References Cited

U.S. PATENT DOCUMENTS

| | | | |
|---|---|---|---|
| 2018/0205937 A1* | 7/2018 | Zhu | G06F 3/012 |
| 2018/0263482 A1* | 9/2018 | Guan | F21V 14/04 |

(Continued)

OTHER PUBLICATIONS

"Office Action Issued in European Patent Application No. 18730932. 3", dated Nov. 19, 2021, 5 Pages.
(Continued)

*Primary Examiner* — Nam D Pham
(74) *Attorney, Agent, or Firm* — Alleman Hall Creasman & Tuttle LLP (57) ABSTRACT

A zoned time-of-flight (ToF) arrangement includes a sensor and a steerable light source that produces an illumination beam having a smaller angular extent than the field of view (FoV) of the sensor. The illumination beam is steerable within the sensor's FoV to optionally move through the sensor's FoV or dwell in a particular region of interest. Steering the illumination beam and sequentially generating a depth map of the illuminated region permits advantageous operations over ToF arrangements that simultaneously illuminate the entire sensor's FoV. For example, ambient performance, maximum range, and jitter are improved. Multiple steering alternative configurations are disclosed, including mechanical, electro optical, and electrowetting solutions.

20 Claims, 8 Drawing Sheets

Related U.S. Application Data continuation-in-part of application No. 15/646,124, filed on Jul. 11, 2017, now Pat. No. 10,430,958.

(51) Int. Cl.
  *G01S 7/499* (2006.01)
  *G01S 17/42* (2006.01)
  *G01S 17/89* (2020.01)
  *G01S 17/894* (2020.01)

(56) References Cited

U.S. PATENT DOCUMENTS

2019/0019302 A1   1/2019  Akkaya et al.
2019/0154809 A1   5/2019  Akkaya et al.
2019/0385321 A1  12/2019  Akkaya et al.

OTHER PUBLICATIONS

"Office Action Issued in Indian Patent Application No. 202117031588", dated Jan. 30, 2023, 7 Pages.

\* cited by examiner

| Z1 | Z2 | Z3 |
|----|----|----|
| Z4 | Z5 | Z6 |
| Z7 | Z8 | Z9 |

ILLUMINATION FOR ZONED TIME-OF-FLIGHT IMAGING

CROSS-REFERENCE TO RELATED APPLICATION

This application is a continuation of U.S. patent application Ser. No. 16/255,817, filed Jan. 23, 2019, which is a continuation-in-part of U.S. patent application Ser. No. 15/646,124, filed Jul. 11, 2017, entitled "ACTIVE ILLUMINATION 3D ZONAL IMAGING SYSTEM", now granted as U.S. Pat. No. 10,430,958, the entirety of each of which is hereby incorporated by reference herein.

BACKGROUND

Three-dimensional (3D) time-of-flight (ToF) cameras provide 3D imaging, using cost effective pixel arrays with an active modulated light source, for applications including gesture detection and 3D scanning. A ToF camera illuminates a scene, senses the reflected light, and translates phase shift data into distance. In some examples, a solid-state laser or a LED operating in the near-infrared range (~850 nm) provides the illumination, and a sensor is used that responds to the same spectrum. The light picked up by the sensor has an ambient component and a reflected signal component. Distance (depth) information is only available in the reflected component, and the ambient component is therefore noise.

When the power density of the ambient component is high, relative to the power density of the reflected component, the signal-to-noise-ratio (SNR) suffers, possibly resulting in degraded distance accuracy and range. One solution is to narrow the field of view (FoV) of the ToF camera, which requires scanning the FoV to capture an entire scene. An alternative solution is to increase the illumination power, which increases power consumption and requires a more expensive light source. Both of these solutions have drawbacks.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to a system for zoned time-of-flight imaging that includes an illumination module comprising: a light source; a diffusing element operative to diffuse light emitted from the light source; and a steering element operative to steer light emitted from the light source, wherein the diffusing element and the steering element are configured so that light emitted from the light source passes through the diffusing element and is directed as an illumination beam in a defined direction by the steering element.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Three-dimensional (3D) time-of-flight (ToF) cameras provide 3D imaging, using cost effective pixel arrays with an active modulated light source, for applications including gesture detection and 3D scanning. A ToF camera illuminates a scene, senses the reflected light, and translates phase shift data into distance. In some examples, a solid-state laser or a LED operating in the near-infrared range (~850 nm) provides the illumination, and a sensor is used that responds to the same spectrum. The light picked up by the sensor has an ambient component and a reflected component. Distance (depth) information is only available in the reflected component, and the ambient component is therefore noise.

When the power density of the ambient component is high, relative to the power density of the reflected component, the signal to noise ratio (SNR) suffers, possibly resulting in degraded distance accuracy and range.

Therefore, a zoned ToF arrangement is introduced that includes a sensor and a steerable light source that produces an illumination beam having a smaller angular extent than the sensor's FoV and thereby provides a greater power density for the same peak power laser. The illumination beam is steerable within the sensor's FoV to optionally move through the sensor's FoV or dwell in a particular region of interest. Steering the illumination beam and sequentially generating a depth map of the illuminated region permits advantageous operations over ToF arrangements that simultaneously illuminate the entire sensor's FoV. For example, ambient performance, maximum range, and jitter are improved. Multiple steering alternative configurations are disclosed, including mechanical, electro optical, micro-electro-mechanical-systems (MEMS), and electrowetting prisms. The steering technique in various embodiments depends on size, power consumption, frequency, angle, positional repeatability and drive voltage requirements of the system and application, as further described herein. Although, in some examples the moving an illumination beam through the sensor's FoV may be accomplished by raster scanning, many examples will dwell in certain regions of interest or move based at least upon the content of scene.

Instead of illuminating the entirety of a sensor's FoV, regions containing an object of interest can be selectively illuminated. Varying modes of operation can include moving through the FoV and dwelling in specific regions for additional imaging periods. This allows more efficient use of laser light because, with less area to illuminate, it is possible to save power. Alternatively, for the same power level, there will be a more intense illumination because the light is more focused. This can compensate for the effects of high ambient light levels, improving SNR. Also, for the same power level, a longer range for depth imaging is enabled because the more intense illumination compensates for beam divergence at greater distances. In this manner, the optical architectures proposed in this disclosure provide compact, low cost solutions that enable advantageous zoned ToF operation. In some examples, different regions of the sensor's FoV are imaged with different exposure times, based on bright and dark objects in same scene, or to compensate for directionally-dependent sources of ambient light. This is a way of tailoring a dynamic range to an illuminated region.

Figure 1:
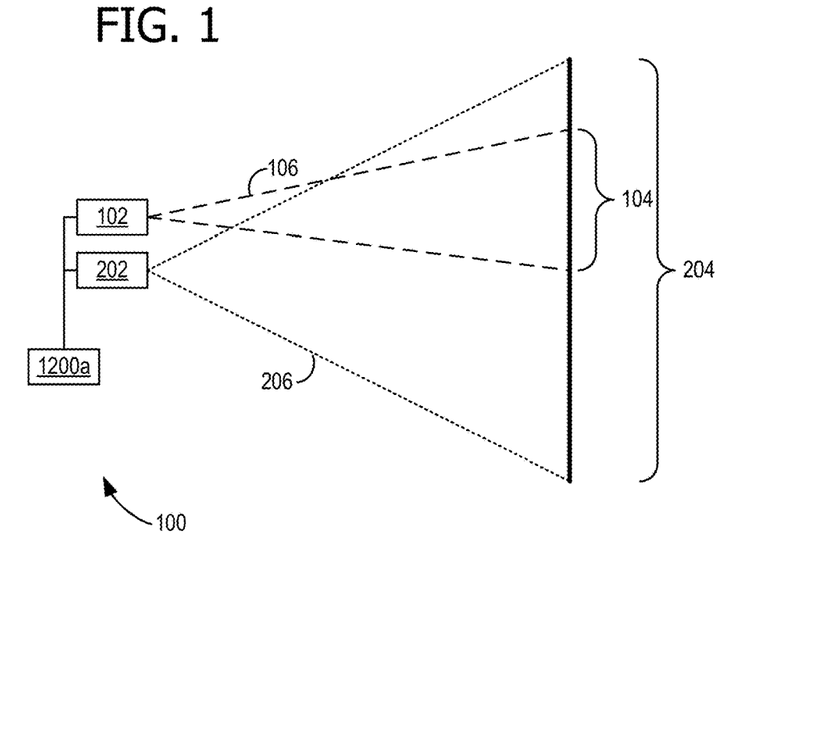
FIG. 1 is a block diagram of an example zoned time-of-flight (ToF) imaging arrangement.

FIG. 1 is a block diagram of an example zoned time-of-flight (ToF) imaging arrangement that includes a zoned ToF imager 100. ToF imager 100 includes an illumination module 102 and a sensor module 202. Illumination module 102 generates an illumination beam 106 with an angular extent 104, and sensor module 202 has a FoV 206 with an angular extent 204. Illumination beam 106 has a smaller angular extent 104 than the sensor FoV 206 angular extent 204. Therefore, sensor module 202 has FoV 206 that has a greater angular extent 204 than the illumination beam 106. It should be understood that FIG. 1 is a side view, and that ToF imager 100 operates in a 3D environment. In some examples, FoV 206 of sensor module 202 has an angular extent 204 in each of two dimensions (azimuth and elevation) that is a multiple of angular extent 104 of illumination beam 106 (e.g., three times as wide). For example, if FoV 206 extends 120 degrees in each azimuth and elevation, illumination beam 106 extends 40 degrees, measured according to the common 3 dB beam width measurement convention.

In ToF arrangements, distance is measured for pixels in a two dimensional (2D) addressable array, resulting in a depth map. A depth map is a collection of 3D points, or voxels. In some examples, a 2D representation of a depth map is a gray-scale image, with brighter intensity indicating a closer the voxel. In some examples, a depth map can be rendered in a 3D space as a collection of points, or a point cloud. ToF is useful for scene understanding, such as in recognizing gestures, which requires segmenting the subject of interest (foreground) to distinguish from other parts of the image (background).

Illumination module 102 and sensor module 202 are both coupled to a ToF controller (TFC) 1200a. Some examples of TFC 1200a include a computing device 1200, which is described in greater detail with respect to FIG. 12. TFC 1200a synchronizes the operations of illumination module 102 and sensor module 202, including controlling the modulation of light and imaging periods, steering illumination beam 106, and generating depth maps (see FIG. 10) in conjunction with sensor module 202. In some examples, sensor module 202 incorporates some or all of TFC 1200a. In some examples, point cloud data stored on TFC 1200a can be accessed by an external node for use in additional processing.

Figure 2:
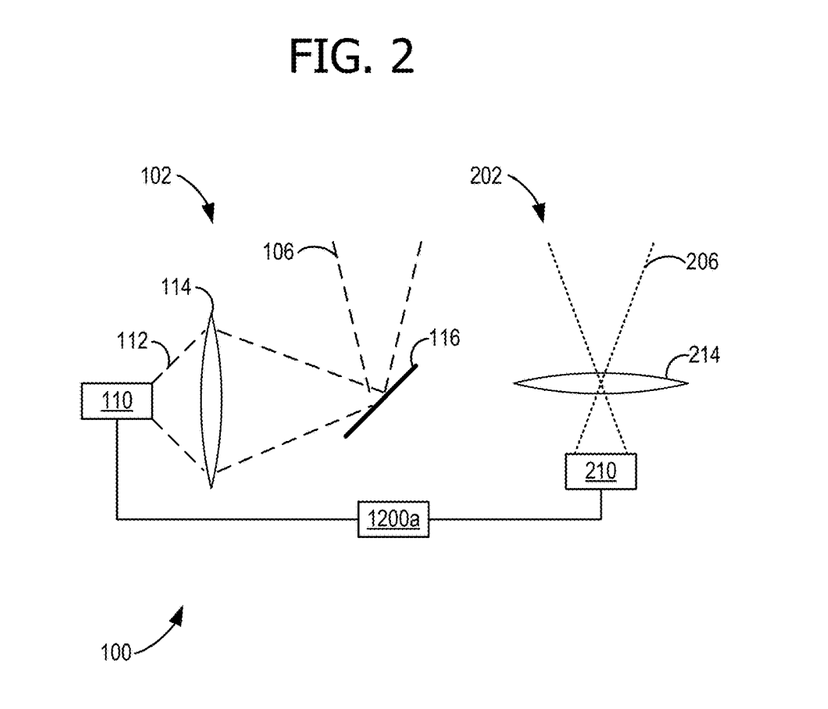
FIG. 2 is a diagram of another example zoned ToF imaging arrangement.

FIG. 2 is a diagram of another example zoned ToF imaging arrangement, showing an exemplary layout for ToF imager 100. It should be understood that FIG. 2, as well as other figures herein, are not necessarily drawn to scale, and that some dimensions may be exaggerated or compressed for illustrative purposes. Illumination module 102 and sensor module 202 are both coupled to TFC 1200a, as explained in relation to FIG. 1. Illumination module 102 comprises a light source 110 that produces a light beam 112 that is focused by a focusing element 114 onto a steering element 116 that is operative to steer light emitted from light source 110 so that it is directed as illumination beam 106 in a defined direction.

Sensor module 202 has a sensor element 210 and a lens 214 that focuses light that had been emitted from light source 110 and then reflected from an imaged scene, within FoV 206, onto operative sensor element 210. Sensor module 202 is thus able to sense light emitted from light source 110 and reflected from the scene, and is then further able to (either working in conjunction with TFC 1200a or by incorporating functionality of TFC 1200a) generate, with the sensed light, a depth map for at least the illuminated region within FoV 206.

Figure 3:
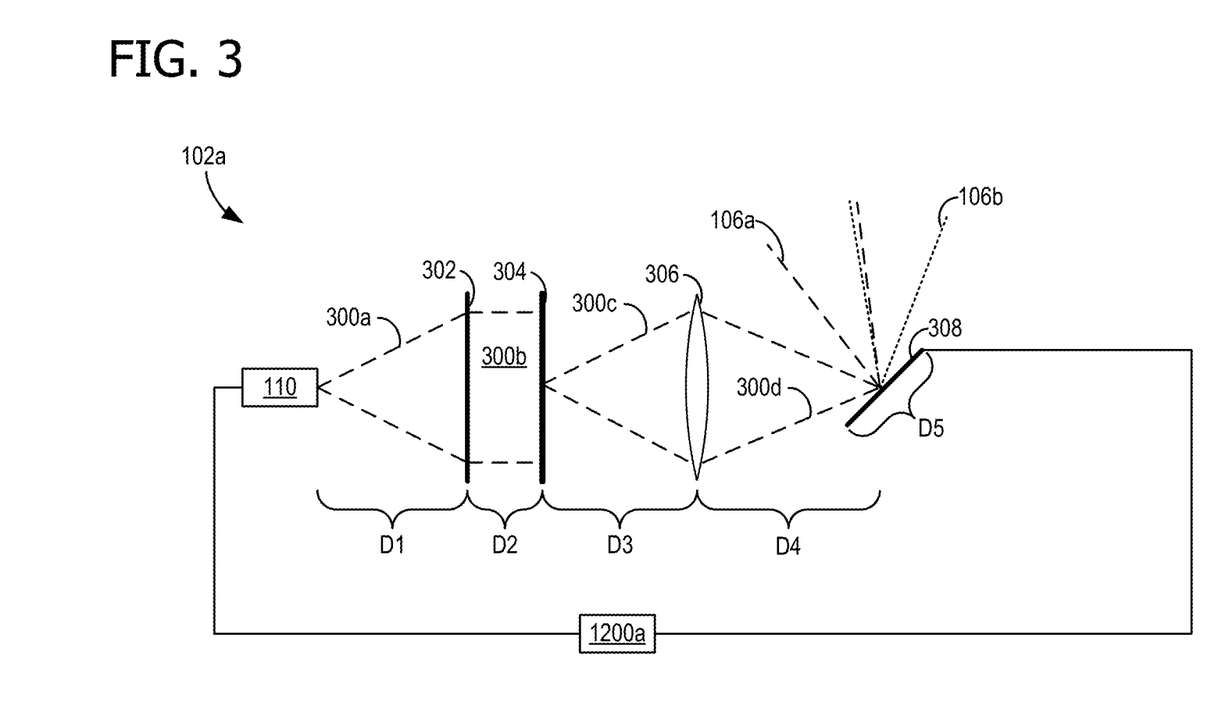
FIG. 3 is a diagram of an example zoned ToF illumination module.

FIG. 3 is a diagram of an example zoned ToF illumination module 102a that is a version of illumination module 102 (of FIGS. 1 and 2). Illumination module 102a comprises light source 110; a collimating element 302, diffusing element 304, a focusing element 306, and a steering element 308. Light source 110, collimating element 302, diffusing element 304, focusing element 306, and steering element 308 are arranged in the order as encountered by the emitted light as: first light source 110, then collimating element 302, then diffusing element 304, then focusing element 306, and then steering element 308.

In operation, a beam of light 300a is emitted from light source 110 and impinges on collimating element 302. Collimating element 302 is operative to collimate light emitted from light source 110, converting beam of light 300a into a collimated beam of light 300b. Collimated beam of light 300b impinges on diffusing element 304, forming an illumination profile. Diffusing element 304 is operative to diffuse light emitted from light source 110, thereby converting collimated beam of light 300b into a diffused beam of light 300c. Diffusing element 304 provides eye safety, a desired angular extent, and/or a desired beam profile (e.g., uniform or Gaussian power profile). Diffused beam of light 300c impinges on focusing element 306, which forms an image of diffusing element 304 on steering element 308, via focused beam of light 300d. In some examples, steering element 308 comprises a movable mirror, providing for a mechanical steering component. Focusing down the light permits the use of a smaller mirror. In some examples, mirrors are flat to avoid phase distortions in the wave front of the light. In some examples, mirrors have an optical profile for focusing. It is typically more expensive to ensure a particular surface profile over larger surfaces. Additionally, smaller mirrors typically can be steered more quickly and require less power to move. Thus, the focusing of the light provides cost and operational advantages.

Steering element 308 is operative to steer light emitted from light source 110, thereby directing focused beam of light 300*d* into steered illumination beam 106*a* (directed toward a first illuminated region) and steered illumination beam 106*b* (directed toward a second illuminated region). In this arrangement, collimating element 302, diffusing element 304, and steering element 308 are configured so that light emitted from light source 110 passes through collimating element 302 and diffusing element 304 and is directed as a steered illumination beam (106*a* or 106*b*) in a defined direction by steering element 308. In some examples, TFC 1200*a* controls steering element 308. In some examples, TFC 1200*a* is incorporated within sensor module 202.

Representative dimensions for an exemplary version of illumination module 102*a* are: D1 is 2 millimeters (mm); D2 is 1 mm; D3 and D4 are 15 mm (the focal distance of focusing element 306) and D5 is 1 mm or less. In some examples, focusing element 306 is a doubly convex lens where f=7.5 mm. In some examples, steering element 308 moves in only a single dimension, and in other examples, steering element 308 moves in two dimensions (up/down and also in/out of the plane of FIG. 3). A static folding mirror may be positioned between collimating element 302 and diffusing element 304.

Figure 4:
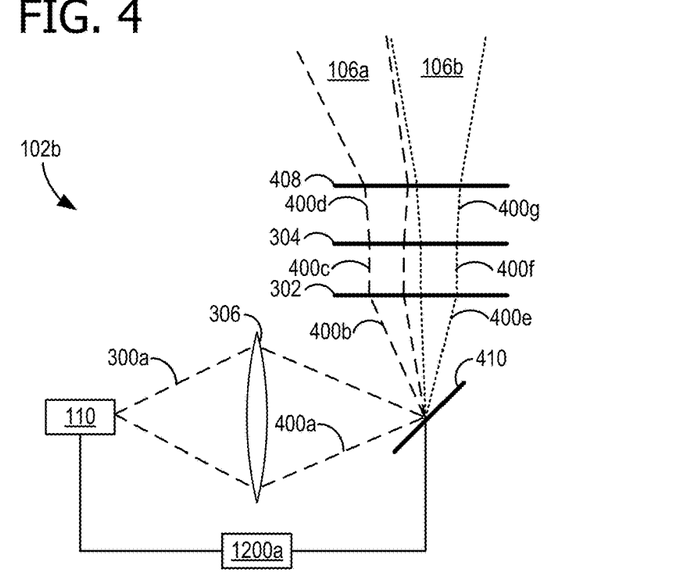
FIG. 4 is a diagram of another example ToF illumination module.

FIG. 4 is a diagram of an example ToF illumination module 102*b* that is a version of illumination module 102 (of FIGS. 1 and 2). Illumination module 102*b* comprises light source 110, focusing element 306, a first steering element 410 or a translation element, collimating element 302, diffusing element 304, and a second steering element 408. Second steering element 408 is static in that it does not move; rather it steers the light by refracting it into different angular directions based upon the location on second steering element 408 where the light impinges. The illustrated elements are arranged in the order as encountered by the emitted light as: light source 110, focusing element 306, first steering element 410, collimating element 302, diffusing element 304, and second steering element 408. In some examples, first steering element 410 comprises a movable mirror (e.g., a micromirror). In such examples, the mirror is not acting as a steering element for the final transmitted illumination beams 106*a* and 106*b*, but is instead translating light laterally (in one or two dimensions) on collimating element 302. In order to accomplish this, first steering element 410 steers the light (internally to ToF illumination module 102*b*) to strike a particular portion of collimating element 302 so that, after passing through collimating element 302, the light strikes a portion of second steering element 408 that refracts the beam to shape and steer it as desired. In some examples, a mirror used as first steering element 410 in illumination module 102*b* can be made smaller than a mirror used as steering element 308 in illumination module 102*a*. In some examples, a film with optical power (e.g., a Fresnel surface) may be added to the first steering element 410.

In operation, beam of light 300*a* is emitted from light source 110 and impinges on focusing element 306, which focuses an image of light source 110 onto first steering element 410 via focused beam of light 400*a*. In some examples, TFC 1200*a* controls first steering element 410; in some examples, TFC 1200*a* is incorporated within sensor module 202. By moving first steering element 410 redirects focused beam of light 400*a* as either a translated beam of light 400*b* or a translated beam of light 400*e*. Translated beam of light 400*b* passes through collimating element 302, which is operative to collimate light, converting translated beam of light 400*b* into a collimated beam of light 400*c*. Collimated beam of light 400*c* impinges on diffusing element 304, which is operative to diffuse light, thereby converting collimated beam of light 400*c* into a diffused beam of light 400*d*. Diffused beam of light 400*d* impinges on second steering element 408. Second steering element 408 is operative to steer light, thereby directing diffused beam of light 400*d* into steered illumination beam 106*a* (directed toward a first illuminated region). A similar path, although translated laterally, results in translated beam of light 400*e* passing through collimating element 302 to become a collimated beam of light 400*f*, then passing through diffusing element 304 to become a diffused beam of light 400*g*, and then finally passing through second steering element 408 to become steered illumination beam 106*b* (directed toward a second illuminated region). In this arrangement, collimating element 302, diffusing element 304, and second steering element 408 are configured so that light emitted from light source 110 passes through collimating element 302 and diffusing element 304 and is directed as a steered illumination beam (106*a* or 106*b*) in a defined direction by second steering element 408.

In some examples, second steering element 408 comprises a refracting lens (e.g., Fresnel, prismatic, etc.) with a non-uniform surface that directs, or steers, light in differing directions based on the lateral position upon which light impinges. Thus, translating light horizontally, with first steering element 410, results in different refracted angles of the light, by second steering element 408, for the purpose of steering illumination beams (106*a* or 106*b*). Translated beam of light 400*b* and translated beam of light 400*e* are diverging beams which are collimated by collimating element 302, in order to permit the use of versions of diffusing element 304 that require nearly normal incidence of light. In some examples, ToF illumination module 102*b* can advantageously can use a smaller mirror than ToF illumination module 102*a* (of FIG. 3) because the image of light source 110 that focused onto first steering element 410 can be smaller than the image of diffusing element 304 that is formed on steering element 308.

Figure 5A:
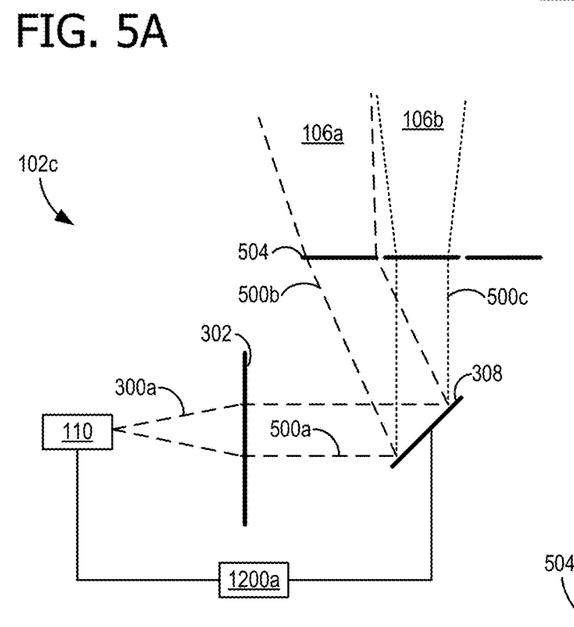
FIG. 5A is a diagram of another example ToF illumination module.

FIG. 5A is a diagram of an example ToF illumination module 102*c* that is a version of illumination module 102 (of FIGS. 1 and 2). Illumination module 102*c* comprises light source 110, collimating element 302, steering element 308, and a diffusing element 504. They are arranged in the order as encountered by the emitted light as: light source 110, collimating element 302, steering element 308, and diffusing element 504. Diffusing element 504 and steering element 308 are configured so that light emitted from light source 110 passes through diffusing element 504 and is directed as an illumination beam in a defined direction by steering element 308, although in illumination module 102*c*, the light encounters steering element 308 prior to encountering diffusing element 504. In some examples, steering element 308 comprises a mirror. In some examples, TFC 1200*a* controls steering element 308; in some examples, TFC 1200*a* is incorporated within sensor module 202.

In operation, beam of light 300*a* is emitted from light source 110 and impinges on collimating element 302, which is operative to collimate light, converting beam of light 300*a* into a collimated beam of light 500*a*. Collimated beam of light 500*a* impinges on steering element 308, which is operative to steer light, thereby directing collimated beam of light 500*a* into a steered beam of light 500*b* or a steered beam of light 500*c*. Steered beam of light 500*b* passes through diffusing element 504 to become steered illumination beam 106*a* (directed toward a first illuminated region). Steered beam of light 500*c* passes through diffusing element 504 to become steered illumination beam 106*b* (directed toward a second illuminated region).

Figure 5B:
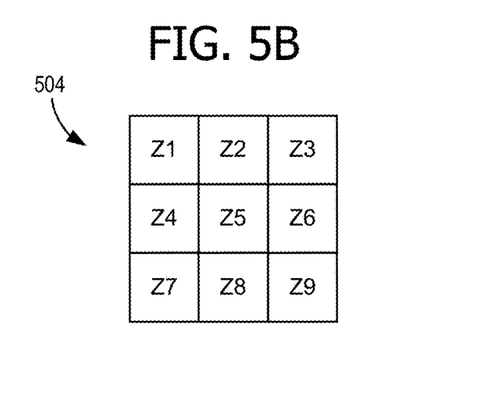
FIG. 5B is a top view of a segmented optical diffuser useable with the ToF illumination module of FIG. 5A.

Whereas FIG. 5A shows diffusing element 504 from the side, FIG. 5B is a top view of diffusing element 504. In the example shown in FIGS. 5A and 5B, diffusing element 504 comprises a segmented optical diffuser. As can be seen in FIG. 5B, diffusing element 504 is divided into nine segments (zones) identified as Z1-Z9. Light impinges on diffusing element 504 approximately normal to the plane of FIG. 5B, with some angle off normal, due to steering. Each of segments Z1-Z9 provides diffractive optical elements designed for specific angles of incidence. This permits separating collimating element 302 from diffusing element 504, and placing steering element 308 between. In some examples, rather than collimating element 302 producing completely collimated light, collimating element 302 may instead focus light narrowly so that a smaller mirror may be used as steering element 308. In some examples, diffusing element 504 compensates for partially collimated light.

Figure 6:
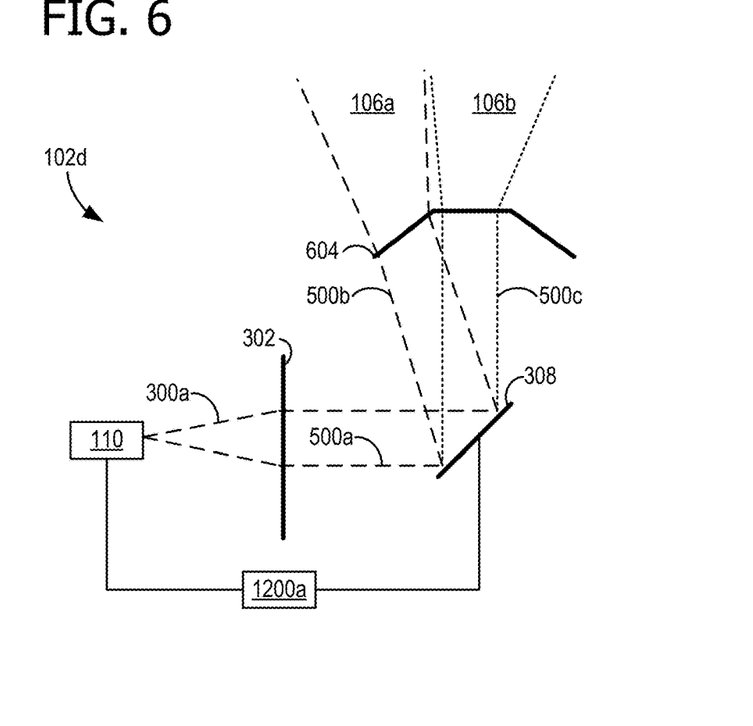
FIG. 6 is a diagram of another example ToF illumination module.

FIG. 6 is a diagram of an example ToF illumination module 102d that is a version of illumination module 102 (of FIGS. 1 and 2). Illumination module 102d is similar to illumination module 102c, with a difference being the use of a domed optical diffuser as diffusing element 604 in place of the segmented optical diffuser used for diffusing element 504. With the domed configuration of diffusing element 604, which may be domed in two dimensions (up/down and also in/out of the plane of FIG. 6), light impinges on each section of diffusing element 604 at close to normal incidence. Although the domed nature of diffusing element 604 is illustrated as piecewise flat segments, some examples of diffusing element 604 have curvature across the domed structure. The domed optical diffuser may also be three-dimensional (e.g., polyhedric).

Illumination module 102d comprises light source 110, collimating element 302, steering element 308, and diffusing element 604. They are arranged in the order as encountered by the emitted light as: light source 110, collimating element 302, steering element 308, and diffusing element 604. Diffusing element 604 and steering element 308 are configured so that light emitted from light source 110 passes through diffusing element 604 and is directed as an illumination beam in a defined direction by steering element 308, although in illumination module 102d, the light encounters steering element 308 prior to encountering diffusing element 604. In some examples, steering element 308 comprises a mirror. In some examples, TFC 1200a controls steering element 308; in some examples, TFC 1200a is incorporated within sensor module 202.

In operation, beam of light 300a is emitted from light source 110 and impinges on collimating element 302, which is operative to collimate light, converting beam of light 300a into collimated beam of light 500a. Collimated beam of light 500a impinges on steering element 308, which is operative to steer light, thereby directing collimated beam of light 500a into a steered beam of light 500b or a steered beam of light 500c. In some examples, rather than collimating element 302 producing completely collimated light, collimating element 302 may instead focus light narrowly so that a smaller mirror may be used as steering element 308. In some examples, diffusing element 604 compensates for partially collimated light. Steered beam of light 500b passes through diffusing element 604 to become steered illumination beam 106a (directed toward a first illuminated region). Steered beam of light 500c passes through diffusing element 604 to become steered illumination beam 106b (directed toward a second illuminated region).

Figure 7:
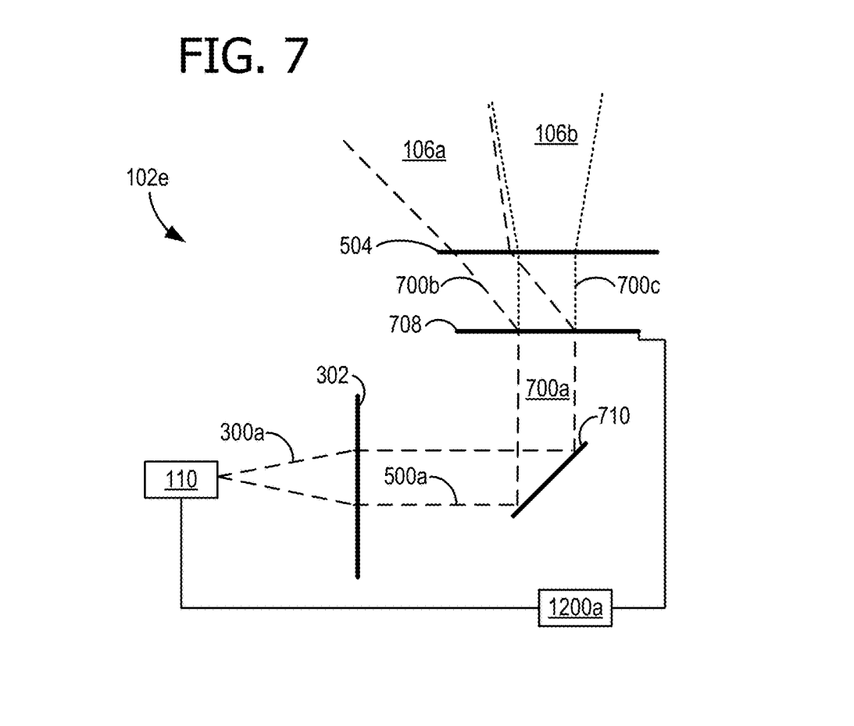
FIG. 7 is a diagram of another example ToF illumination module.

FIG. 7 is a diagram of an example ToF illumination module 102e that is a version of illumination module 102 (of FIGS. 1 and 2). Illumination module 102e comprises light source 110, collimating element 302, steering element 708, and diffusing element 504. They are arranged in the order as encountered by the emitted light as: light source 110, collimating element 302, steering element 708, and diffusing element 504. Diffusing element 504 and steering element 708 are configured so that light emitted from light source 110 passes through diffusing element 504 and is directed as an illumination beam in a defined direction by steering element 708, although in illumination module 102e, the light encounters steering element 708 prior to encountering diffusing element 504.

In some examples, steering element 708 comprises a switchable polarization grating, providing for an electro optical steering component. In some examples, TFC 1200a controls steering element 708. In some examples, TFC 1200a is incorporated within sensor module 202. In the illustrated example, illumination module 102e further comprises a folding mirror 710. Folding mirror 710 is used when fabrication options for illumination module 102e favor orienting light source 110 in a different plane than the intended direction of illumination. For example, fabricating lasers that produce beams parallel to a circuit board may be more cost effective, even when the direction of intended illumination is predominantly orthogonal to the plane of the circuit board.

In operation, beam of light 300a is emitted from light source 110 and impinges on collimating element 302, which is operative to collimate light, converting beam of light 300a into collimated beam of light 500a. Collimated beam of light 500a impinges on folding mirror 710, which redirects the light as a redirected beam of light 700a toward steering element 708. In some examples, rather than collimating element 302 producing completely collimated light, collimating element 302 may instead focus light narrowly so that a smaller folding mirror 710 may be used. Steering element 708 directs redirected beam of light 700a into a steered beam of light 700b or a steered beam of light 700c. Steered beam of light 700b passes through diffusing element 504 to become steered illumination beam 106a (directed toward a first illuminated region). Steered beam of light 700c passes through diffusing element 504 to become steered illumination beam 106b (directed toward a second illuminated region).

Figure 8:
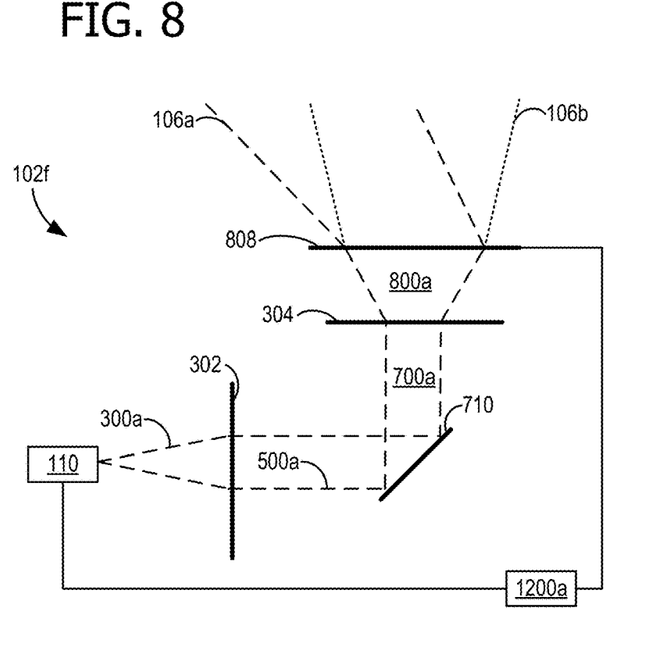
FIG. 8 is a diagram of another example ToF illumination module.

FIG. 8 is a diagram of an example ToF illumination module 102f that is a version of illumination module 102 (of FIGS. 1 and 2). Illumination module 102f comprises light source 110, collimating element 302, diffusing element 304, and a steering element 808. They are arranged in the order as encountered by the emitted light as: light source 110, collimating element 302, the mirror, diffusing element 304, steering element 808. Diffusing element 304 and steering element 808 are configured so that light emitted from light source 110 passes through diffusing element 304 and is directed as an illumination beam in a defined direction by steering element 808.

In some examples, steering element 808 comprises a switchable polarization grating, providing for electro optical steering. In some examples, TFC 1200a controls steering element 808. In some examples, TFC 1200a is incorporated within sensor module 202. In the illustrated example, illumination module 102f further comprises an optional folding mirror 710, which is used when fabrication options for illumination module 102f favor orienting light source 110 in a different plane than the intended direction of illumination.

In operation, beam of light 300a is emitted from light source 110 and impinges on collimating element 302, which is operative to collimate light, converting beam of light 300*a* into collimated beam of light 500*a*. Collimated beam of light 500*a* impinges on folding mirror 710, which redirects the light as redirected beam of light 700*a* toward diffusing element 304. Diffusing element 304, which is operative to diffuse light, converts redirected beam of light 700*a* into a diffused beam of light 800*a*. Diffused beam of light 800*a* impinges on steering element 808. Steering element 808 is operative to steer light, thereby directing diffused beam of light 800*a* into steered illumination beam 106*a* (directed toward a first illuminated region) or steered illumination beam 106*b* (directed toward a second illuminated region).

Figure 9:
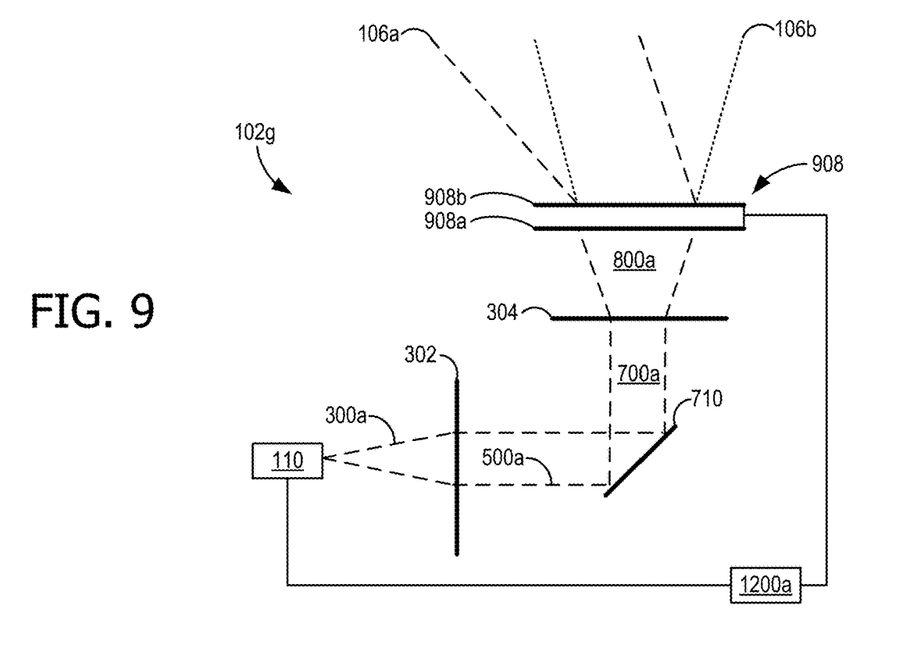
FIG. 9 is a diagram of another example ToF illumination module.

FIG. 9 is a diagram of an example ToF illumination module 102*g* that is a version of illumination module 102 (of FIGS. 1 and 2). Illumination module 102*g* comprises light source 110, collimating element 302, diffusing element 304, and a steering element 908. They are arranged in the order as encountered by the emitted light as: light source 110, collimating element 302, the mirror, diffusing element 304, steering element 908. Diffusing element 304 and steering element 908 are configured so that light emitted from light source 110 passes through diffusing element 304 and is directed as an illumination beam in a defined direction by steering element 908.

In some examples, steering element 908 comprises a liquid crystal lens (for example a pair of liquid crystal lenses), providing for steering by an electrowetting steering solution (an electrowetting component) in some versions. Steering element 908 is illustrated as a tandem set of lens arrays 908*a* and 908*b*. In some examples of lens array 908*a* and lens array 908*b*, arrays of microlenses are suspended in a liquid crystal that can be adjusted electrically, to steer light. In some examples of lens array 908*a* and lens array 908*b*, horizontal translation of lens array 908*a* relative to lens array 908*b* steers light. In some examples, TFC 1200*a* controls steering element 908. In some examples, TFC 1200*a* is incorporated within sensor module 202. In the illustrated example, illumination module 102*g* further comprises an optional folding mirror 710, which is used when fabrication options for illumination module 102*g* favor orienting light source 110 in a different plane than the intended direction of illumination.

In operation, beam of light 300*a* is emitted from light source 110 and impinges on collimating element 302, which is operative to collimate light, converting beam of light 300*a* into collimated beam of light 500*a*. Collimated beam of light 500*a* impinges on folding mirror 710, which redirects the light as redirected beam of light 700*a* toward diffusing element 304. Diffusing element 304, which is operative to diffuse light, converts redirected beam of light 700*a* into a diffused beam of light 800*a*. Diffused beam of light 800*a* impinges on steering element 908. Steering element 908 is operative to steer light, thereby directing diffused beam of light 800*a* into steered illumination beam 106*a* (directed toward a first illuminated region) or steered illumination beam 106*b* (directed toward a second illuminated region).

Figure 10:
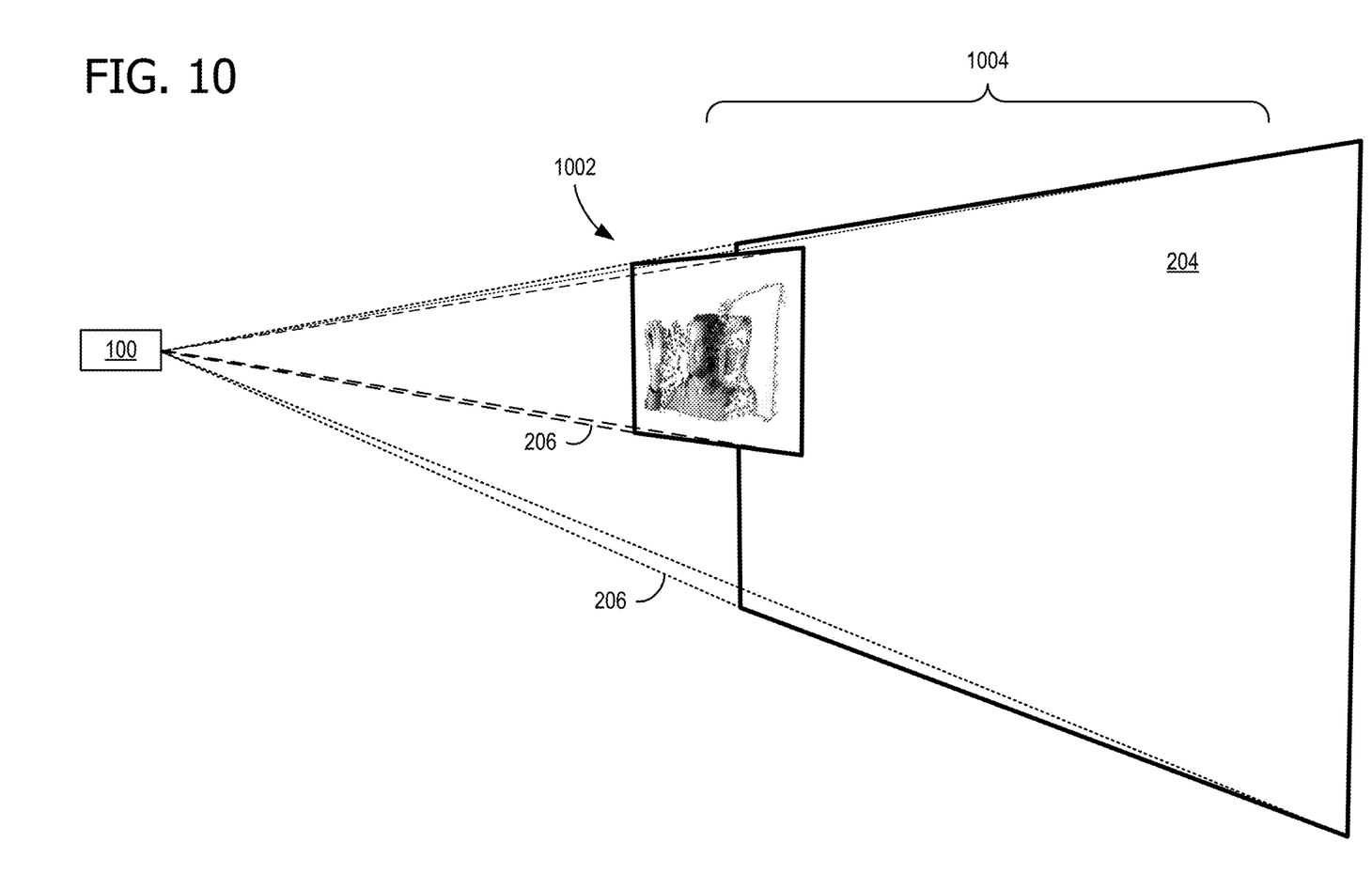
FIG. 10 is a diagram of an example zoned ToF imaging arrangement generating a depth map.

FIG. 10 is a diagram of an example zoned ToF imaging arrangement generating a depth map 1002 of a scene 1004 with ToF imager 100. ToF imager 100 calculates the depth for each pixel in depth map 1002, which involves de-aliasing, in some examples. As described previously (see FIGS. 1 and 2), ToF imager 100 includes sensor module 202 which is operative to generate depth map 1002 of scene 1004 within at least a portion of sensor FoV 206 by sensing light emitted from light source 110 and reflected from scene 1004. That is, ToF imager 100 is capable of imaging whatever portions of scene 1004 are within angular extent 204 of FoV 206. In some examples, sensor module 202 generates depth map 1002 using internal functionality of TFC 1200*a*. In some examples, sensor module 202 generates depth map 1002 using external functionality of TFC 1200*a*, working in conjunction with TFC 1200*a*.

As illustrated in FIG. 10, illumination beam 106 illuminates a region of FoV 206. Thus, illumination beam 106 may be steered illumination beam 106*a* or steered illumination beam 106*a* (of FIGS. 3-9). One advantage of imaging only a region within FoV 206 is that the dynamic range of ToF imager 100 can be tailored to conditions within an illuminated region (e.g., tailoring responsiveness based on ambient light and distance conditions).

Figure 11:
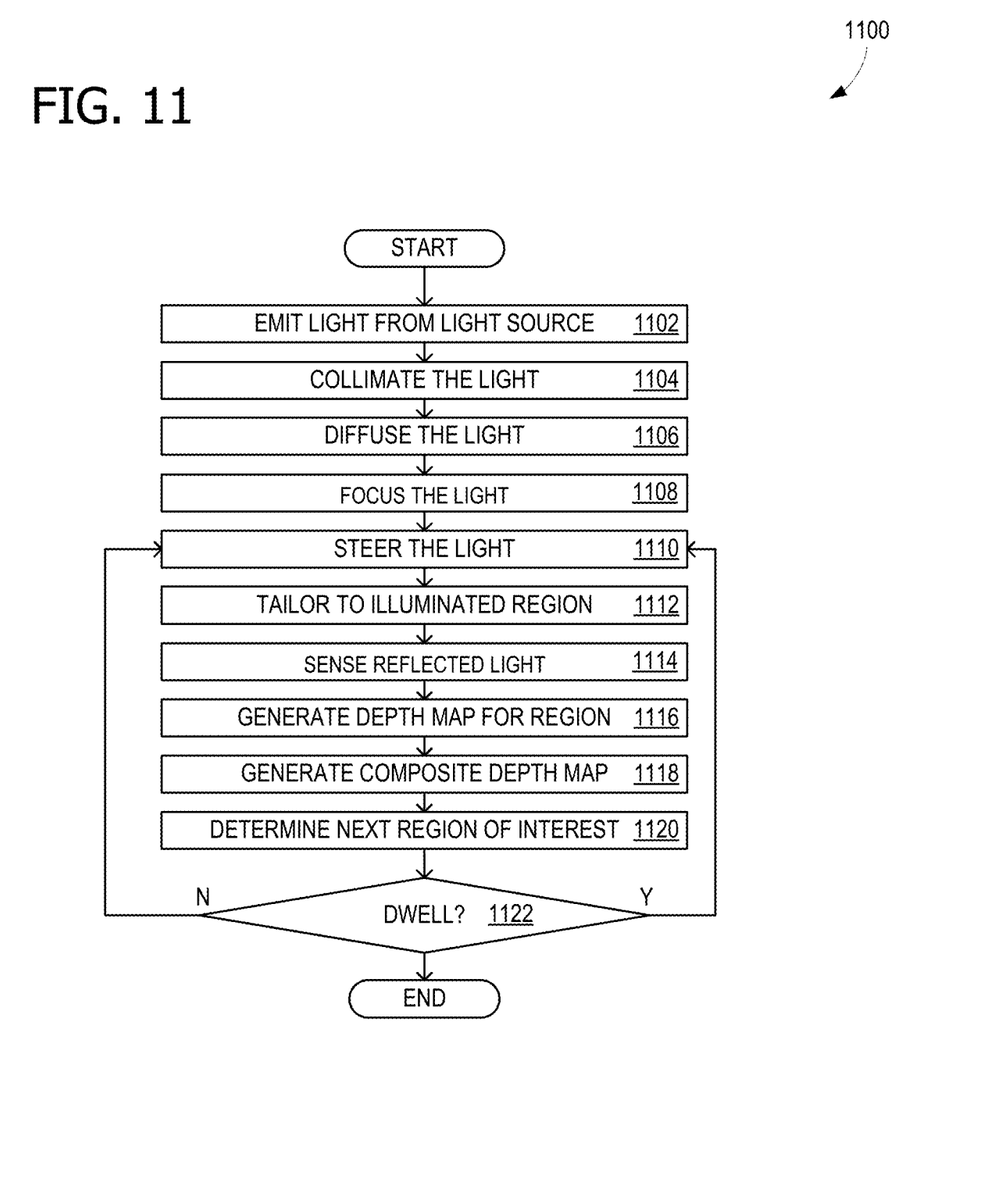
FIG. 11 is a flow chart illustrating exemplary operations involved in zoned ToF imaging that may be used with any of the arrangements of FIGS. 1-10.

FIG. 11 is a flow chart 1100 illustrating exemplary operations involved in zoned ToF imaging that may be used with any of the arrangements illustrated in FIGS. 1-10. In operation 1102, light emitted is from a light source (e.g., light source 110), and operation 1104 includes at least partially collimating the light emitted from the light source. Operation 1106 includes diffusing the light emitted from the light source, and operation 1108 includes focusing the light. In some examples, operation 1108 involves forming an illumination profile on the steering element, whereas in some examples, operation 1108 involves focusing an image of the light source onto a steering element. Operation 1110 then includes steering, with a steering element, an illumination beam to a selected region within a field of view of a sensor. It should be understood that operations 1104-1110 can occur in a different order; some of operations 1104-1108 may be omitted, and some of operations 1104-1110 may be combined, in accordance with the various examples described herein.

In some examples, steering comprises illuminating different segments of a segmented diffuser. In some examples, steering comprises moving a mirror. In some examples, steering comprises illuminating at least one element selected from the list consisting of a refracting lens, a polarization grating, and a liquid crystal lens. With any of these, operation 1110 includes steering, with a steering element, an illumination beam to a selected region within a field of view of a sensor module, wherein the sensor module has a field of view that has a greater angular extent than the illumination beam, and wherein the illumination beam comprises light emitted from a light source. In a first pass through operation 1110, the selected region is a first region within a field of view of the sensor module.

Operation 1112 includes tailoring a dynamic range to an illuminated region. One way to accomplish this is by adjusting the illumination power (e.g. the power of the light emitted from the light source). Another way to accomplish this is to tailor exposure times to different regions of the sensor's FoV. For example, the exposure time in a particular illuminated region can be based on bright and dark objects within that region, or set to compensate for directionally-dependent sources of ambient light. Thus, there are various ways of tailoring a dynamic range to an illuminated region. Operation 1114 includes sensing, with the sensor module, light emitted from the light source and reflected from the scene, and operation 1116 includes generating, with the sensed light, a depth map for at least the illuminated region. In a first pass through operation 1110, the illuminated region is the first region.

Operation 1120 includes determining the next region of interest for illumination and imaging. Instead of illuminating the entirety of a sensor's FoV, regions containing an object of interest can be selectively illuminated. In some examples, certain passes through operation 1120 includes avoiding steering the illumination beam to a second region within the field of view of the sensor module to save power. Varying modes of operation can include moving through the FoV and dwelling in specific regions for additional imaging periods. This allows more efficient use of laser light because, with less area to illuminate, it is possible to save power. Alternatively, for the same power level, there will be a more intense illumination because the light is more focused. This can compensate for the effects of high ambient light levels, improving SNR. Also, for the same power level, a longer range for depth imaging is enabled, because the more intense illumination compensates for beam divergence at greater distances. In this manner, the optical architectures proposed in this disclosure provide compact, low cost solutions that enable advantageous zoned ToF operation. Decision operation 1122 determines whether the illumination module will dwell in the same region.

If decision operation 1122 determines that the illumination module will dwell in the same region, then prior to steering the illumination beam to a second region within the field of view of a sensor module, illumination beam will be retained in the first region for an additional imaging period, as flow chart 1100 returns to operation 1110. If, however, decision operation 1122 determines that the illumination module will not dwell in the same region, then operation 1110 includes steering, with the steering element, the illumination beam to a second region within the field of view of a sensor module. Continuing on, operation 1112 includes tailoring the dynamic range to the second region. In this manner, different dynamic ranges may be used for different regions within the same sensor FoV, such as by using different illumination power and/or different exposure (integration) times. Operation 1114 includes sensing, with the sensor module, light emitted from the light source and reflected from the scene, and operation 1116 includes generating, with the sensed light, a depth map for at least the second region. On a second or subsequent pass, operation 1118 includes generating a composite depth map by combining depth maps for different regions (e.g., different regions illuminated in multiple passes through operations 1110-1116).

Additional Examples

Some aspects and examples disclosed herein are directed to a system for zoned time-of-flight imaging comprising: an illumination module comprising: a light source; a diffusing element operative to diffuse light emitted from the light source; and a steering element operative to steer light emitted from the light source, wherein the diffusing element and the steering element are configured so that light emitted from the light source passes through the diffusing element and is directed as an illumination beam in a defined direction by the steering element.

Additional aspects and examples disclosed herein are directed to a system for zoned time-of-flight imaging comprising: an illumination module comprising: a light source; a collimating element operative to collimate light emitted from the light source; a diffusing element operative to diffuse light emitted from the light source; and a steering element operative to steer light emitted from the light source, wherein the collimating element, the diffusing element, and the steering element are configured so that light emitted from the light source passes through the collimating element and the diffusing element, and is directed as an illumination beam in a defined direction by the steering element; wherein the steering element comprises at least one element selected from the list consisting of: a mirror, a refracting lens, a polarization grating, and a liquid crystal lens; and a sensor module operative to generate a depth map of a scene within at least a portion of a field of view of the sensor by sensing light emitted from the light source and reflected from the scene, wherein the sensor module has a field of view that, in each of two dimensions, is a multiple of an angular extent of the illumination beam, and wherein the illumination beam is steerable within the field of view of the sensor module.

Additional aspects and examples disclosed herein are directed to a process for zoned time-of-flight imaging comprising: steering, with a steering element, an illumination beam to a first region within a field of view of a sensor module, wherein the sensor module has a field of view that has a greater angular extent than the illumination beam, and wherein the illumination beam comprises light emitted from a light source; diffusing the light emitted from the light source; sensing, with the sensor module, light emitted from the light source and reflected from a scene; and generating, with the sensed light, a depth map for at least the first region.

Alternatively, or in addition to the other examples described herein, examples include any combination of the following:

- a sensor module operative to generate a depth map of a scene within at least a portion of a field of view of the sensor by sensing light emitted from the light source and reflected from the scene;
- the sensor module has a field of view that has a greater angular extent than the illumination beam, and wherein the illumination beam is steerable within the field of view of the sensor module;
- the field of view of the sensor module has an angular extent in each of two dimensions that is a multiple of the angular extent of the illumination beam;
- the illumination module further comprises collimating element operative to collimate light emitted from the light source, wherein the collimating element, the diffusing element, and the steering element are configured so that light emitted from the light source passes through the collimating element and the diffusing element and is directed as an illumination beam in a defined direction by the steering element;
- the illumination module further comprises a focusing element, wherein the light source, the collimating element, the diffusing element, the focusing element, and the steering element are arranged in order as: the light source, the collimating element, the diffusing element, the focusing element, and the steering element;
- the steering element comprises a mirror;
- the illumination module further comprises a focusing element and a translation element, wherein the light source, the focusing element, the translation element, the collimating element, the diffusing element, and the steering element are arranged in order as: the light source, the focusing element, the translation element, the collimating element, the diffusing element, and the steering element;
- the translation element comprises a mirror;
- the steering element comprises a refracting lens;
- the light source, the collimating element, the steering element, and the diffusing element are arranged in order as: the light source, the collimating element, the steering element, and the diffusing element;
- the diffusing element comprises a segmented optical diffuser;

the diffusing element comprises a domed optical diffuser;
the steering element comprises a polarization grating;
the illumination module further comprises a mirror;
the light source, the collimating element, the mirror, the diffusing element, and the steering element are arranged in order as: the light source, the collimating element, the mirror, the diffusing element, and the steering element;
the steering element comprises a liquid crystal lens;
forming an illumination profile on the steering element;
focusing an image of the light source onto a steering element;
steering comprises illuminating different segments of a segmented diffuser;
at least partially collimating the light emitted from the light source;
steering, with the steering element, the illumination beam to a second region within the field of view of the sensor module; and generating, with the sensed light, a depth map for at least the second region;
prior to steering the illumination beam to the second region within the field of view of the sensor module, retaining the illumination beam in the first region for an additional imaging period;
avoiding steering the illumination beam to a second region within the field of view of the sensor module to save power;
generating a composite depth map by combining depth maps for different regions; and
tailoring a dynamic range to an illuminated region.

In some examples, a system for zoned time-of-flight (ToF) imaging comprises an illumination module. The illumination module comprises a light source, a diffusing element operative to diffuse light emitted from the light source, and a steering element operative to steer light emitted from the light source. The diffusing element and the steering element are configured so that light emitted from the light source passes through the diffusing element and is directed as an illumination beam in a defined direction by the steering element. The illumination module further comprises a collimating element operative to collimate light emitted from the light source. The collimating element, the diffusing element, and the steering element are configured so that light emitted from the light source passes through the collimating element and the diffusing element and is directed as an illumination beam in a defined direction by the steering element. The illumination module further comprises a focusing element. The light source, the collimating element, the diffusing element, the focusing element, and the steering element are arranged in order from the light source as the collimating element, the diffusing element, the focusing element, and the steering element. The steering element comprises a mirror.

In some examples, a system for zoned time-of-flight (ToF) imaging comprises an illumination module. The illumination module comprises a light source, a diffusing element operative to diffuse light emitted from the light source, and a steering element operative to steer light emitted from the light source. The diffusing element and the steering element are configured so that light emitted from the light source passes through the diffusing element and is directed as an illumination beam in a defined direction by the steering element. The illumination module further comprises a collimating element operative to collimate light emitted from the light source. The collimating element, the diffusing element, and the steering element are configured so that light emitted from the light source passes through the collimating element and the diffusing element and is directed as an illumination beam in a defined direction by the steering element. The illumination module further comprises a focusing element and a translation element. The light source, the focusing element, the translation element, the collimating element, the diffusing element, and the steering element are arranged in order from the light source as the focusing element, the translation element, the collimating element, the diffusing element, and the steering element. The translation element comprises a mirror.

In some examples, a system for zoned time-of-flight (ToF) imaging comprises an illumination module. The illumination module comprises a light source, a diffusing element operative to diffuse light emitted from the light source, and a steering element operative to steer light emitted from the light source. The diffusing element and the steering element are configured so that light emitted from the light source passes through the diffusing element and is directed as an illumination beam in a defined direction by the steering element. The illumination module further comprises a collimating element operative to collimate light emitted from the light source. The collimating element, the diffusing element, and the steering element are configured so that light emitted from the light source passes through the collimating element and the diffusing element and is directed as an illumination beam in a defined direction by the steering element. The illumination module further comprises a focusing element and a translation element. The light source, the focusing element, the translation element, the collimating element, the diffusing element, and the steering element are arranged in order from the light source as the focusing element, the translation element, the collimating element, the diffusing element, and the steering element. The steering element comprises a refracting lens.

In some examples, a system for zoned time-of-flight (ToF) imaging comprises an illumination module. The illumination module comprises a light source, a diffusing element operative to diffuse light emitted from the light source, and a steering element operative to steer light emitted from the light source. The diffusing element and the steering element are configured so that light emitted from the light source passes through the diffusing element and is directed as an illumination beam in a defined direction by the steering element. The illumination module further comprises a collimating element operative to collimate light emitted from the light source. The collimating element, the diffusing element, and the steering element are configured so that light emitted from the light source passes through the collimating element and the diffusing element and is directed as an illumination beam in a defined direction by the steering element. The light source, the collimating element, the steering element, and the diffusing element are arranged in order from the light source as the collimating element, the steering element, and the diffusing element. The steering element comprises a mirror.

In some examples, a system for zoned time-of-flight (ToF) imaging comprises an illumination module. The illumination module comprises a light source, a diffusing element operative to diffuse light emitted from the light source, and a steering element operative to steer light emitted from the light source. The diffusing element and the steering element are configured so that light emitted from the light source passes through the diffusing element and is directed as an illumination beam in a defined direction by the steering element. The illumination module further comprises a collimating element operative to collimate light emitted from the light source. The collimating element, the diffusing element, and the steering element are configured so that light emitted from the light source passes through the collimating element and the diffusing element and is directed as an illumination beam in a defined direction by the steering element. The light source, the collimating element, the steering element, and the diffusing element are arranged in order from the light source as the collimating element, the steering element, and the diffusing element. The steering element comprises a polarization grating. The illumination module further comprises a mirror.

While the aspects of the disclosure have been described in terms of various examples with their associated operations, a person skilled in the art would appreciate that a combination of operations from any number of different examples is also within scope of the aspects of the disclosure.

Example Operating Environment

Figure 12:
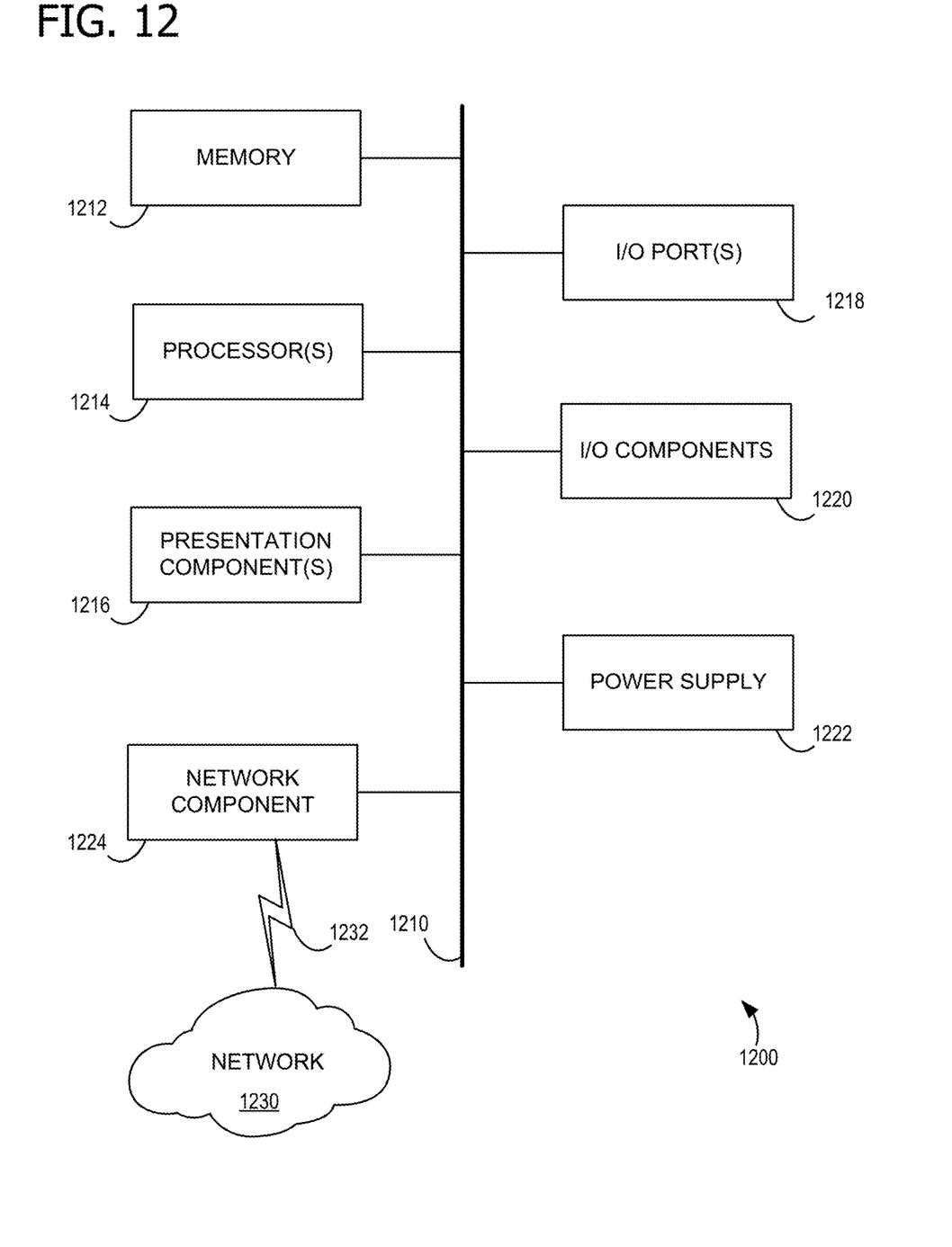
FIG. 12 is a block diagram of an example computing environment suitable for implementing some of the various examples disclosed herein.

FIG. 12 is a block diagram of an example computing device 1200 for implementing aspects disclosed herein, and is designated generally as computing device 1200. Computing device 1200 is but one example of a suitable computing environment and is not intended to suggest any limitation as to the scope of use or functionality of the examples disclosed herein. Some examples of computing device 1200 include TFC 1200a. Neither should the computing device 1200 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1200 includes a bus 1210 that directly or indirectly couples the following devices: computer-storage memory 1212, one or more processors 1214, one or more presentation components 1216, input/output (I/O) ports 1218, I/O components 1220, a power supply 1222, and a network component 1224. Computer device 1200 should not be interpreted as having any dependency or requirement related to any single component or combination of components illustrated therein. While computer device 1200 is depicted as a seemingly single device, multiple computing devices 1200 may work together and share the depicted device resources. For instance, computer-storage memory 1212 may be distributed across multiple devices, processor(s) 1214 may provide housed on different devices, and so on.

Bus 1210 represents what may be one or more busses (such as an address bus, data bus, or a combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 12 is merely illustrative of an exemplary computing device that can be used in connection with one or more disclosed examples. Distinction is not made between such categories as "workstation," "server," "laptop," "hand-held device," etc., as all are contemplated within the scope of FIG. 12 and the references herein to a "computing device." Computer-storage memory 1212 may take the form of the computer-storage media references below and operatively provide storage of computer-readable instructions, data structures, program modules and other data for the computing device 1200. For example, computer-storage memory 1212 may store an operating system, a universal application platform, or other program modules and program data. Computer-storage memory 1212 may be used to store and access instructions configured to carry out the various operations disclosed herein.

As mentioned below, computer-storage memory 1212 may include computer-storage media in the form of volatile and/or nonvolatile memory, removable or non-removable memory, data disks in virtual environments, or a combination thereof. And computer-storage memory 1212 may include any quantity of memory associated with or accessible by the computing device 1200. The memory 1212 may be internal to the computing device 1200 (as shown in FIG. 12), external to the computing device 1200 (not shown), or both (not shown). Examples of memory 1212 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1200. Additionally, or alternatively, the computer-storage memory 1212 may be distributed across multiple computing devices 1200, e.g., in a virtualized environment in which instruction processing is carried out on multiple devices 1200. For the purposes of this disclosure, "computer storage media," "computer-storage memory," "memory," and "memory devices" are synonymous terms for the computer-storage memory 1212, and none of these terms include carrier waves or propagating signaling.

Processor(s) 1214 may include any quantity of processing units that read data from various entities, such as memory 1212 or I/O components 1220. Specifically, processor(s) 1214 are programmed to execute computer-executable instructions for implementing aspects of the disclosure. The instructions may be performed by the processor, by multiple processors within the computing device 1200, or by a processor external to the client computing device 1200. In some examples, the processor(s) 1214 are programmed to execute instructions such as those illustrated in the flowcharts discussed below and depicted in the accompanying drawings. Moreover, in some examples, the processor(s) 1214 represent an implementation of analog techniques to perform the operations described herein. For example, the operations may be performed by an analog client computing device 1200 and/or a digital client computing device 1200. Presentation component(s) 1216 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1200, across a wired connection, or in other ways. Ports 1218 allow computing device 1200 to be logically coupled to other devices including I/O components 1220, some of which may be built in. Examples I/O components 1220 include, for example but without limitation, a microphone, joystick, game pad, satellite dish, scanner, printer, wireless device, etc.

The computing device 1200 may operate in a networked environment via the network component 1224 using logical connections to one or more remote computers. In some examples, the network component 1224 includes a network interface card and/or computer-executable instructions (e.g., a driver) for operating the network interface card. Communication between the computing device 1200 and other devices may occur using any protocol or mechanism over any wired or wireless connection. In some examples, the network component 1224 is operable to communicate data over public, private, or hybrid (public and private) using a transfer protocol, between devices wirelessly using short range communication technologies (e.g., near-field communication (NFC), Bluetooth™ branded communications, or the like), or a combination thereof. For example, network component 1224 communicates over communication link 1232 with network 1230.

Although described in connection with an example computing device 1200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A system for zoned time-of-flight (ToF) imaging, the system comprising:
   a time-of-flight sensor module configured to generate a depth image of a scene based at least in part on a temporal phase shift between an illumination beam and reflected light from the scene;
   an illumination module configured to output the illumination beam having with a smaller angular extent than a field of view of the time-of-flight sensor module; and a steering element configured to steer the illumination beam through the field of view of the time-of-flight sensor module.

2. The system of claim 1, wherein the time-of-flight sensor module is configured to generate a portion of the depth image of the scene within at least a first region of the field of view of the time-of-flight sensor module by sensing light emitted from the illumination module and reflected from the scene.

3. The system of claim 2, wherein the depth image is a composite depth image, and the time-of-flight sensor module is further configured to generate the composite depth image by combining two or more depth image portions for two or more sequentially illuminated regions of the field of view of the time-of-flight sensor module.

4. The system of claim 1, wherein the illumination module comprises:
    a light source; and
    a diffusing element configured to diffuse light emitted from the light source, wherein the diffusing element and the steering element are configured so that light emitted from the light source passes through the diffusing element and is directed as the illumination beam in a defined direction by the steering element.

5. The system of claim 4, wherein the illumination module further comprises:
    a collimating element configured to collimate light emitted from the light source, wherein the collimating element, the diffusing element, and the steering element are configured so that light emitted from the light source passes through the collimating element and the diffusing element and is directed as the illumination beam in the defined direction by the steering element.

6. The system of claim 5, wherein the illumination module further comprises a focusing element, and wherein the light source, the collimating element, the diffusing element, the focusing element, and the steering element are arranged in order from the light source as: the light source, the collimating element, the diffusing element, the focusing element, and the steering element.

7. The system of claim 5, wherein the illumination module further comprises a focusing element and a translation element, and wherein the light source, the focusing element, the translation element, the collimating element, the diffusing element, and the steering element are arranged in order from the light source as: the light source, the focusing element, the translation element, the collimating element, the diffusing element, and the steering element.

8. The system of claim 5, wherein the light source, the collimating element, the steering element, and the diffusing element are arranged in order from the light source as: the light source, the collimating element, the steering element, and the diffusing element.

9. The system of claim 5, wherein the illumination module further comprises a mirror, and wherein the light source, the collimating element, the mirror, the diffusing element, and the steering element are arranged in order from the light source as: the light source, the collimating element, the mirror, the diffusing element, and the steering element.

10. The system of claim 4, wherein the diffusing element comprises a segmented optical diffuser or a domed optical diffuser.

11. The system of claim 1, wherein the steering element comprises a pair of liquid crystal lenses.

12. The system of claim 1, wherein the steering element comprises a polarization grating.

13. A method for zoned time-of-flight (ToF) imaging, the method comprising:
    steering, with a steering element, an illumination beam emitted by a light source to a first region within a field of view of a time-of-flight sensor module, wherein the field of view of the time-of-flight sensor module has a greater angular extent than the illumination beam;
    sensing, with the time-of-flight sensor module, light emitted from the light source and reflected from a scene; and
    generating, with the sensed light, at least a first portion of a depth image for at least the first region based at least in part on a temporal phase shift between the illumination beam and the light reflected from the scene.

14. The method of claim 13, further comprising forming an illumination profile on the steering element.

15. The method of claim 13, further comprising focusing an image of the light source onto the steering element.

16. The method of claim 13, wherein the steering comprises illuminating different segments of a segmented diffuser.

17. The method of claim 13, further comprising at least partially collimating the light emitted from the light source.

18. The method of claim 13, wherein the depth image is a composite depth image, and the method further comprises generating the composite depth image by combining two or more depth image portions for two or more sequentially illuminated regions of the field of view of the time-of-flight sensor module.

19. The method of claim 13, further comprising, prior to steering the illumination beam to a second region within the field of view of the time-of-flight sensor module, retaining the illumination beam in the first region for an additional imaging period.

20. A system for zoned time-of-flight (ToF) imaging, the system comprising:
    a time-of-flight sensor module operative to generate a depth image of a scene based at least in part on a temporal phase shift between an illumination beam and reflected light from the scene;
    an illumination module configured to output the illumination beam having with a smaller angular extent than a field of view of the time-of-flight sensor module, the illumination module comprising:
    a light source;
    a diffusing element operative to diffuse light emitted from the light source; and
    a steering element operative to steer diffused light from the diffusing element in a defined direction.

* * * * *